United States Patent
Kimura

(10) Patent No.: US 6,930,700 B2
(45) Date of Patent: Aug. 16, 2005

(54) OPTICAL SCANNING METHOD, OPTICAL SCANNER AND IMAGE FORMING APPARATUS

(75) Inventor: Tetsuya Kimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 134 days.

(21) Appl. No.: 10/452,458

(22) Filed: Jun. 2, 2003

(65) Prior Publication Data

US 2003/0226959 A1 Dec. 11, 2003

(30) Foreign Application Priority Data

Jun. 11, 2002 (JP) ........................................ 2002-169989

(51) Int. Cl.[7] .................................................. B41J 2/44
(52) U.S. Cl. ...................................................... 347/234
(58) Field of Search ................................ 347/229, 231, 347/232, 233, 241–243, 256–261, 116–118

(56) References Cited

U.S. PATENT DOCUMENTS

| | | |
|---|---|---|
| 5,615,038 A | 3/1997 | Suzuki et al. |
| 5,786,594 A | 7/1998 | Ito et al. |
| 6,108,501 A | 8/2000 | Nagai |
| 2003/0001945 A1 | 1/2003 | Maeda |
| 2003/0030718 A1 | 2/2003 | Maeda |

FOREIGN PATENT DOCUMENTS

| | | |
|---|---|---|
| JP | 11301032 | 11/1999 |
| JP | 2002162593 | 6/2002 |

OTHER PUBLICATIONS

Translation of JP 2002–162593.*

* cited by examiner

Primary Examiner—Huan Tran
(74) Attorney, Agent, or Firm—Cooper & Dunham LLP

(57) ABSTRACT

An optical scanner can write a full-color image without occurrence of writing position differences even if a record density is switched. The optical scanner includes a black writing illuminant for optically writing an image at a plurality of record densities and a color writing illuminant for optically writing the image at a predetermined record density. The optical scanner adjusts a resist position for a full-color image with respect to the main and sub-scanning directions by switching a writing position of the black writing illuminant in accordance with a requested record density and then writes the full-color image at that writing position.

14 Claims, 11 Drawing Sheets

FIG.1A PRIOR ART      FIG.1B PRIOR ART
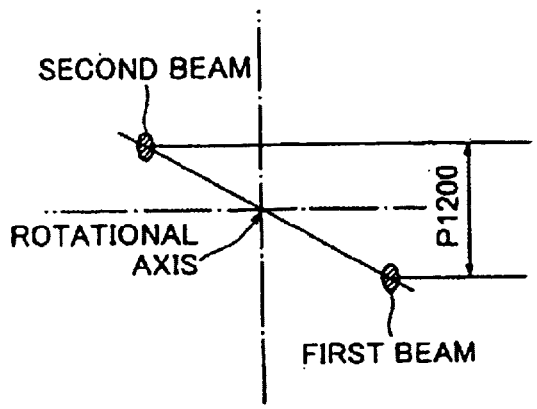
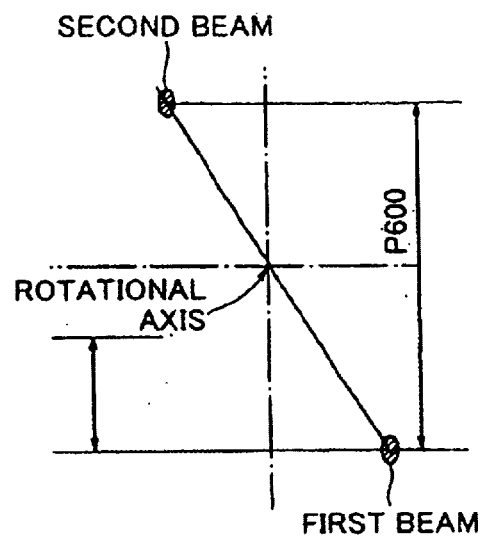
FIG.2
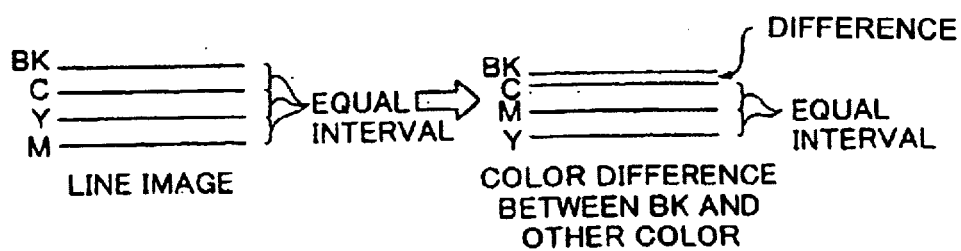

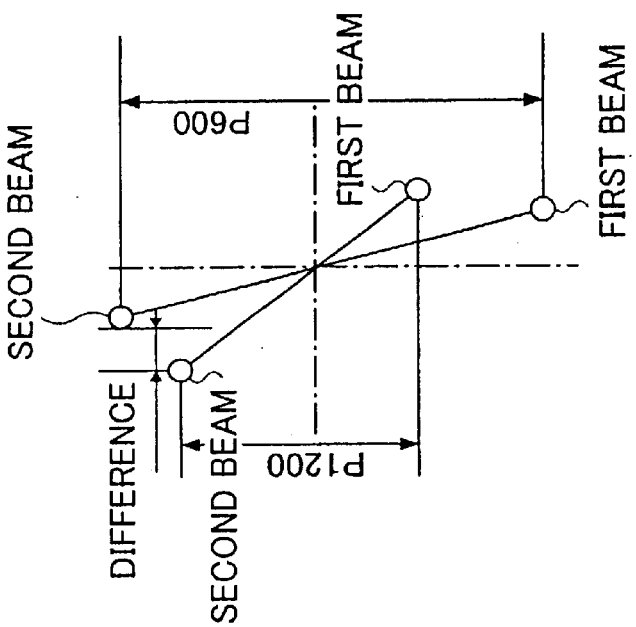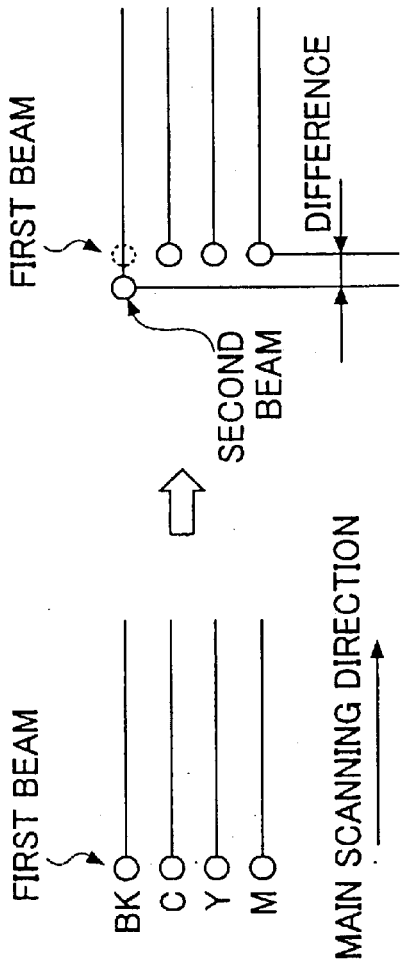

OPTICAL SCANNING METHOD, OPTICAL SCANNER AND IMAGE FORMING APPARATUS

BACKGROUND OF THE INVENTION

1. Field of the Invention

The present invention generally relates to an optical scanning method, an optical scanner and an image forming apparatus, and more particularly to an optical scanning method and an optical scanner for writing latent images by radiating optical beams on scanned surfaces of a plurality of linearly arranged image carrying members, and an image forming apparatus such as a copier, a printer and a plotter that can form a multi-color image by developing the latent images with distinct color developers and then sequentially transferring the developed color images to a transferred member.

2. Description of the Related Art

In a conventional tandem type color image forming apparatus, optical beams emitted from a plurality of illuminants are radiated to four linearly arranged image carrying members such as photosensitive drums in order to write latent images thereon. The latent images formed on the image carrying members are developed to visualize the latent images by using distinct color developers, typically, a yellow toner, a magenta toner, a cyan toner and a black toner. Then, a transferred member such as a recorded paper is carried on a transfer belt to each transferring part of the image carrying members, and the individual color images are sequentially superposed on the transferred member. The resulting color image on the transferred member is fixed, and it is possible to produce a multi-color image.

In such a conventional tandem type color image forming apparatus, an optical scanner, such as an optical writing apparatus, is prepared for each of the image carrying members, and the optical writing apparatus writes a latent image on the corresponding image carrying member. However, the optical writing apparatus is relatively expensive because the optical writing apparatus contains an optical deflector formed of a polygon mirror and a drive motor for driving the optical deflector. For this reason, components and assembly costs of the conventional tandem type color image forming apparatus can be problematic, as it is necessary to provide a plurality of optical writing apparatuses corresponding to the plurality of image carrying members. In addition, it is necessary to provide an adequate installation space in the image forming apparatus to accommodate the optical writing apparatuses each of which includes an optical deflector. As a result, it is impossible to avoid a size increase in an image forming apparatus in which it is desired to include such optical writing apparatuses.

Furthermore, although a tandem type color image forming apparatus is capable of forming a color image, the occasion in offices to produce monochrome manuscripts is greater than that of color manuscripts. As the tandem type color image forming apparatus is required to produce more full-color manuscripts at higher speeds, the tandem type color image forming apparatus has more significant problems, including the following:

1. a complicated mechanism for superposing four colors,
2. a cost increase of motors and drive parts for driving photosensitive members,
3. a short life span of the motors and the drive parts for driving the photosensitive members.

In order to meet such office use, conventional color image forming apparatuses are designed to achieve higher productivity in a monochrome mode than in a full-color mode; that is, to operate in the monochrome mode at higher line speed than in the full-color mode. Such color image forming apparatuses can offer monochrome manuscripts at higher speed than full-color manuscripts; that is, the color image forming apparatuses can form more images in the monochrome mode per unit of time than in the full-color mode.

On the other hand, there is a color image forming apparatus that allows a user to switch between a quality priority mode and a speed priority mode. For instance, the color image forming apparatus produces an image at a resolution of 1200 dpi in the quality priority mode and at a resolution of 600 dpi in the speed priority mode. In the quality priority mode, the image forming apparatus writes an image at a higher write density under a constraint of lower line speed so that a high-quality manuscript can be obtained, albeit at the cost of a slower operating speed. In contrast, in the speed priority mode, the image forming apparatus writes an image at higher line speed under a constraint of moderate image quality so that high-speed operations can be achieved, albeit at the cost of a lower resolution image quality.

In the above-mentioned color image forming apparatus, when a user wants to obtain more monochrome manuscripts in the speed priority mode than in the quality priority mode, a user is allowed to select the operation mode from the quality priority mode and the speed priority mode by switching the pixel density. In the conventional color image forming apparatus, two beams for black (BK) are prepared therein together with a pitch switching mechanism, and one beam for each of yellow (Y), magenta (M) and cyan (C) is provided therein. Then, there are four mode combinations: a monochrome quality priority mode, a monochrome speed priority mode, a color quality priority mode, and a color speed priority mode. In the monochrome quality priority (1200 dpi) mode, the color image forming apparatus operates two BK beams at a pitch of 1200 dpi with respect to the sub-scanning direction at low line speed. In the monochrome speed priority (600 dpi) mode, the color image forming apparatus operates the two BK beams at a pitch of 600 dpi with respect to the sub-scanning direction at high line speed. In the color quality priority (1200 dpi) mode, the color image forming apparatus operates color beams and one of the two BK beams, each of which writes an image at the pitch of 1200 dpi with respect to the sub-scanning direction at low line speed. At this time, only one of the two BK beams is switched ON. In the color speed priority (600 dpi) mode, the color image forming apparatus operates the color beams and one of the two BK beams, each of which writes an image at the pitch of 600 dpi with respect to the sub-scanning direction at high line speed.

According to the above-mentioned color image forming apparatus, when resist positions of four colors (BK, C, M, Y) are adjusted with respect to the main scanning direction and the sub-scanning direction (only one beam is used for BK), it is necessary to properly set a pixel density switching position of BK as either 600 dpi or 1200 dpi. If the pixel density switching position is not properly adjusted, there is a probability that a produced full-color image has a color difference due to misalignment of the BK write position as shown in FIGS. 1A and 1B.

FIGS. 1A and 1B show dot positions of optical spots for two-beam writing under two pixel densities of 1200 dpi and 600 dpi. FIG. 1A shows dot positions of a first beam and a second beam at a resolution of 1200 dpi, and FIG. 1B shows dot positions of a first beam and a second beam at a resolution of 600 dpi.

As shown in FIG. 1A, when an image is written at the resolution of 1200 dpi with respect to the sub-scanning direction, a pitch of 21 μm (=25.4 mm/1200) between adjacent optical spots is obtained. As shown in FIG. 1B, when an image is written at the resolution of 600 dpi with respect to the sub-scanning direction, a pitch of 42 μm (=25.4 mm/600) between adjacent optical spots is obtained. As seen in FIGS. 1A and 1B, a dot position of an optical spot has a difference L of 10.5 μm between the two resolutions, as computed from the following formula:

$$L=(42\ \mu m-21\ \mu m)/2$$

FIG. 2 shows the difference of dot positions with respect to the sub-scanning direction between the two resolutions. When one of the BK beams is used in the full color modes, there is a probability that a color difference between BK and another color (cyan in FIG. 2) may occur with respect to the sub-scanning direction if beam pitch positions are not properly adjusted for alternation between the two resolutions of 1200 dpi and 600 dpi. This color difference is caused by the narrowed beam pitch between BK and the other color by the difference L.

On the other hand, FIGS. 3A through 3C show a difference of dot positions with respect to the main scanning direction between the two resolutions. As shown in FIG. 3A, full-color adjustment for properly producing full-color images is performed for the first beam with respect to the main scanning direction. In fact, however, if the second beam, which is not adjusted, is used to form the full-color images, a color difference arises between the second beam and the other color beams with respect to the main scanning direction, as is shown in FIG. 3B. As previously mentioned, this color difference is caused by the difference of dot positions of BK beams as shown in FIG. 3C. As used herein, the phrase "full-color adjustment" means to correct color differences caused at shipment and during use. Japanese Laid-Open Patent Application No. 11-301032 discloses an adjustment technique for correcting such color differences.

SUMMARY OF THE INVENTION

It is a general object of the present invention to provide an optical scanning method, an optical scanner and an image forming apparatus in which the above-mentioned problems are eliminated.

A more specific object of the present invention is to provide an optical scanner that has a write density switching function to correct misalignment of a writing position of a full-color image even if a BK write density is switched.

Another more specific object of the present invention is to provide an image forming apparatus that can form a full-color image without any color difference even if the BK write density is switched.

In order to achieve the above-mentioned objects, there is provided according to one aspect of the present invention an optical scanning method for writing an image in an image formed medium by using a black writing illuminant and a color writing illuminant wherein the black writing illuminant writes the image at a plurality of record densities and the color writing illuminant writes the image at a predetermined record density, the optical scanning method including the steps of: adjusting a resist position for a full-color image with respect to a main scanning direction and a sub-scanning direction by changing a writing position of the black writing illuminant in accordance with a requested one of the record densities; and writing the full-color image at the writing position in the image formed medium.

According to the above-mentioned invention, when the record density or writing speed is changed at formation time of a full-color image, it is possible to write the full-color image at a writing position suitable to the full-color image formation. As a result, there is no probability that a color difference arises due to misalignment of the writing position.

Additionally, there is provided according to another aspect of the present invention an optical scanner for writing an image in an image formed medium, including: a black writing illuminant optically writing the image at a plurality of record densities; a color writing illuminant optically writing the image at a predetermined record density; a storage part storing writing position data of the black writing illuminant corresponding to the record densities; and a writing position switching part switching a writing position of the black writing illuminant based on the writing position data in the storage part so as to properly form a full-color image, wherein the writing position data are used to adjust a resist position for the full-color image with respect to a main scanning position and a sub-scanning position.

According to the above-mentioned invention, when a full-color image is written, it is possible to properly write the full-color image by switching a writing position of the black writing illuminant into a state where color differences due to shipment and use thereof are corrected. As a result, even if the record density and the writing speed have differences from those in the corrected state, there is no probability that a color difference arises due to misalignment of the writing position.

In the above-mentioned optical scanner, the black writing illuminant may include at least two semiconductor lasers, a retaining part retaining the semiconductor lasers in a state where the semiconductor lasers are fixed relative to each other, a supporting part supporting the retaining part such that the retaining part can be rotated with respect to a predetermined rotational axis, and a driving part rotating the retaining part with respect to the rotational axis.

According to the above-mentioned invention, even if the black writing illuminant is constituted as a two-beam illuminant, it is possible to easily adjust writing positions of two beams from the black writing illuminant by simply setting a rotational position thereof.

In the above-mentioned optical scanner, the driving part may include a stepping motor.

According to the above-mentioned invention, since a rotation angle of the black writing illuminant can be determined through the number of steps of the stepping motor, it is possible to easily control the rotation angle.

In the above-mentioned optical scanner, the writing position switching part may drive the stepping motor so as to switch the writing position of the black writing illuminant based on the writing position data in the storage part.

According to the above-mentioned invention, when a full-color image is formed, it is possible to automatically switch record densities by using the writing position switching part.

In the above-mentioned optical scanner, the black writing illuminant may have two semiconductor lasers, and the rotational axis may be located at one of a middle point between writing positions of the two semiconductor lasers and a writing position of one of the two semiconductor lasers.

According to the above-mentioned invention, it is possible to determine the writing position through the rotation angle. If a relationship between writing positions and rotation angles is prescribed in advance, it is possible to easily set a desired position as the writing position.

Additionally, there is provided according to another aspect of the present invention an image forming apparatus, including: an optical scanner writing an image in an image formed medium, the optical scanner comprising: a black writing illuminant optically writing the image at a plurality of record densities; a color writing illuminant optically writing the image at a predetermined record density; a storage part storing writing position data of the black writing illuminant corresponding to the record densities; and a writing position switching part switching a writing position of the black writing illuminant based on the writing position data in the storage part so as to properly form a full-color image, wherein the writing position data are used to adjust a resist position for the full-color image with respect to a main scanning position and a sub-scanning position; and an image forming part developing individual color images written by the optical scanner and forming the full-color image on a record medium.

According to the above-mentioned invention, it is impossible to properly form the full-color image written by the optical scanner without any color difference.

In the above-mentioned image forming apparatus, the optical scanner optically may write the individual color images on image carrying members, which are linearly arranged, corresponding to the color images.

According to the above-mentioned invention, when the above-mentioned tandem type image forming apparatus is used to write a full-color image in linearly arranged image carrying members corresponding to individual colors, it is possible to suppress color differences. The tandem type image forming apparatus includes a plurality of illuminant units of a multi-beam black writing illuminant having the record density switching part and single-beam color writing illuminants. When the tandem type image forming apparatus writes latent color images by irradiating optical beams on scanned surfaces of the image carrying members therein, the tandem type image forming apparatus changes a writing position of the black writing illuminant by adjusting resist positions of the black image with respect to the main scanning direction and the sub-scanning direction (regardless of record densities of 600 dpi, 1200 dpi and 2400 dpi). Then, the tandem type image forming apparatus writes the black image at that writing position. As a result, there is no probability of writing position differences occurring. Furthermore, users can select a quality priority mode and a speed priority mode by switching the record densities so that the image forming apparatus can produce more monochrome images than full-color images.

Other objects, features and advantages of the present invention will become more apparent from the following detailed description when read in conjunction with the accompanying drawings.

BRIEF DESCRIPTION OF THE DRAWINGS

FIGS. 1A and 1B are diagrams illustrating dot positions of optical spots for two-beam writing under two pixel densities of 1200 dpi and 600 dpi, respectively;

FIG. 2 is a diagram illustrating a difference of dot positions with respect to a sub-scanning direction between the two pixel densities;

FIGS. 3A through 3C are diagrams illustrating a difference of dot positions with respect to the main scanning direction between the two pixel densities;

DETAILED DESCRIPTION OF THE PREFERRED EMBODIMENTS

In the following, embodiments of the present invention will be described with reference to the accompanying drawings.

A description will now be given, with reference to FIG. 4, of an image forming apparatus according to the present invention.

Figure 4:
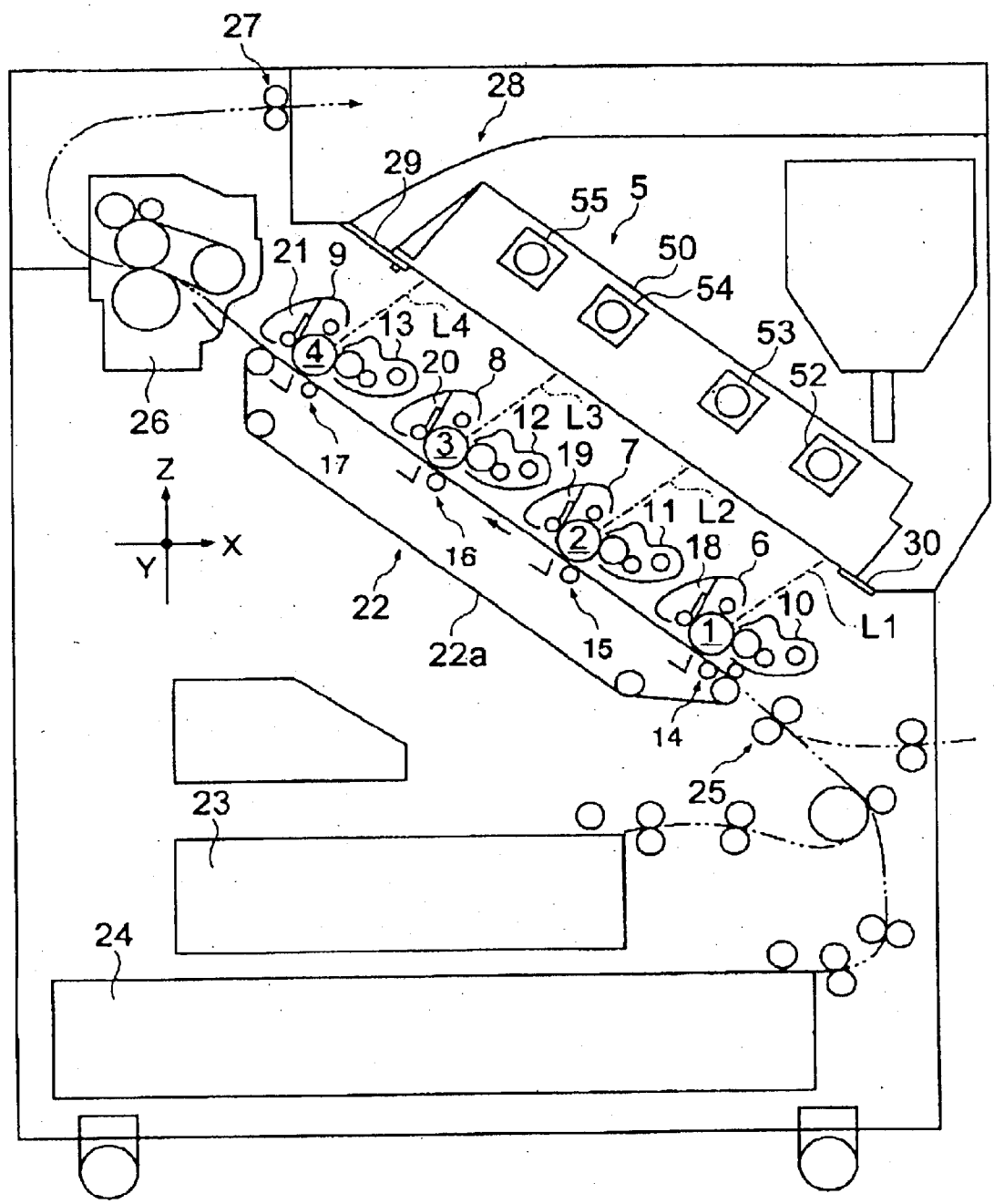
FIG. 4 is a side elevational view roughly illustrating a structure of an image forming apparatus according to the present invention.

FIG. 4 roughly shows a structure of the image forming apparatus according to the present invention. The image forming apparatus comprises a plurality of drum-shaped photoconductive photosensitive members (which are referred to as photosensitive drums hereinafter) 1, 2, 3 and 4, electrifying parts 6, 7, 8 and 9, an optical scanner 5 serving as an exposing part, developing parts 10, 11, 12 and 13, a transferring-carrying apparatus 22, cleaning parts 18, 19, 20 and 21. As shown in FIG. 4, the image forming apparatus is a full-color image forming apparatus in that the photosensitive drums 1, 2, 3 and 4, which are linearly arranged therein, are used to form color images corresponding to individual colors such as black (BK), cyan (C), magenta (M) and yellow (Y), respectively. The photosensitive drums 1, 2, 3 and 4 are not limited to the as-shown arrangement and may be arranged in any suitable manner. As shown in FIG. 4, the other above-mentioned parts (the electrifying parts 6, 7, 8 and 9, the developing parts 10, 11, 12 and 13, and the cleaning parts 18, 19, 20 and 21) for forming images through electrophotographic processing are provided around the respective photosensitive drums 1, 2, 3 and 4. The electrifying parts 6, 7, 8 and 9 are formed of charge rollers, charge brushes, electrifying charger, for example. The optical scanner 5, which is to be described in greater detail below, uses optical beams L1, L2, L3 and L4 to expose scanned surfaces of the photosensitive drums 1, 2, 3 and 4. The developing parts 10, 11, 12 and 13 serve as developing apparatuses, each of which corresponds to individual colors of BK, C, M and Y. The transferring-carrying apparatus 22 includes a transferring-carrying belt 22a and transferring parts 14, 15, 16 and 17, which are formed of transferring rollers and transferring brushes, for example, in the inward-facing side of the transferring-carrying belt 22a. The cleaning parts 18, 19, 20 and 21 are formed of cleaning blades and cleaning brushes, for example. In this configuration, the image forming apparatus according to the present invention can form individual color images on the photosensitive drums 1, 2, 3 and 4.

In FIG. 4, the X and Y directions represent horizontal directions of a space where the image forming apparatus is located, and the Z direction represents a vertical direction thereof. As shown in FIG. 4, the four photosensitive drums 1, 2, 3 and 4 are linearly arranged to have a slope with respect to the X-Y plane. In FIG. 4, the photosensitive drums 1, 2, 3 and 4 are arranged to have a negative slope in the Z-X coordinate directions. The transferring-carrying apparatus 22 is provided slantingly relatively to the X-Y plane in nearly parallel relation to the arrangement of the four photosensitive drums 1, 2, 3 and 4. A transferred member such as a record paper is fed from the lower end of the sloped arrangement of parts and is carried upwards to transferring parts 14, 15, 16 and 17 of the photosensitive drums 1, 2, 3 and 4 sequentially on the transferring-carrying belt 22a. A fixing apparatus 26 is provided at upper end of the sloped arrangement of parts, that is, the lower stream of the carrying direction of the transferred member. Also, the optical scanner 5 is mounted around an upper corner of the linearly arranged photosensitive drums 1, 2, 3 and 4, which serve as image forming parts. A housing 50 of the optical scanner 5 is mounted slantingly relative to the X-Y plane such that the housing 50 is nearly parallel to the arrangement of the photosensitive drums 1, 2, 3 and 4. The housing 50 is fixed to sloped frame members 29 and 30 of the image forming apparatus.

Figure 5:
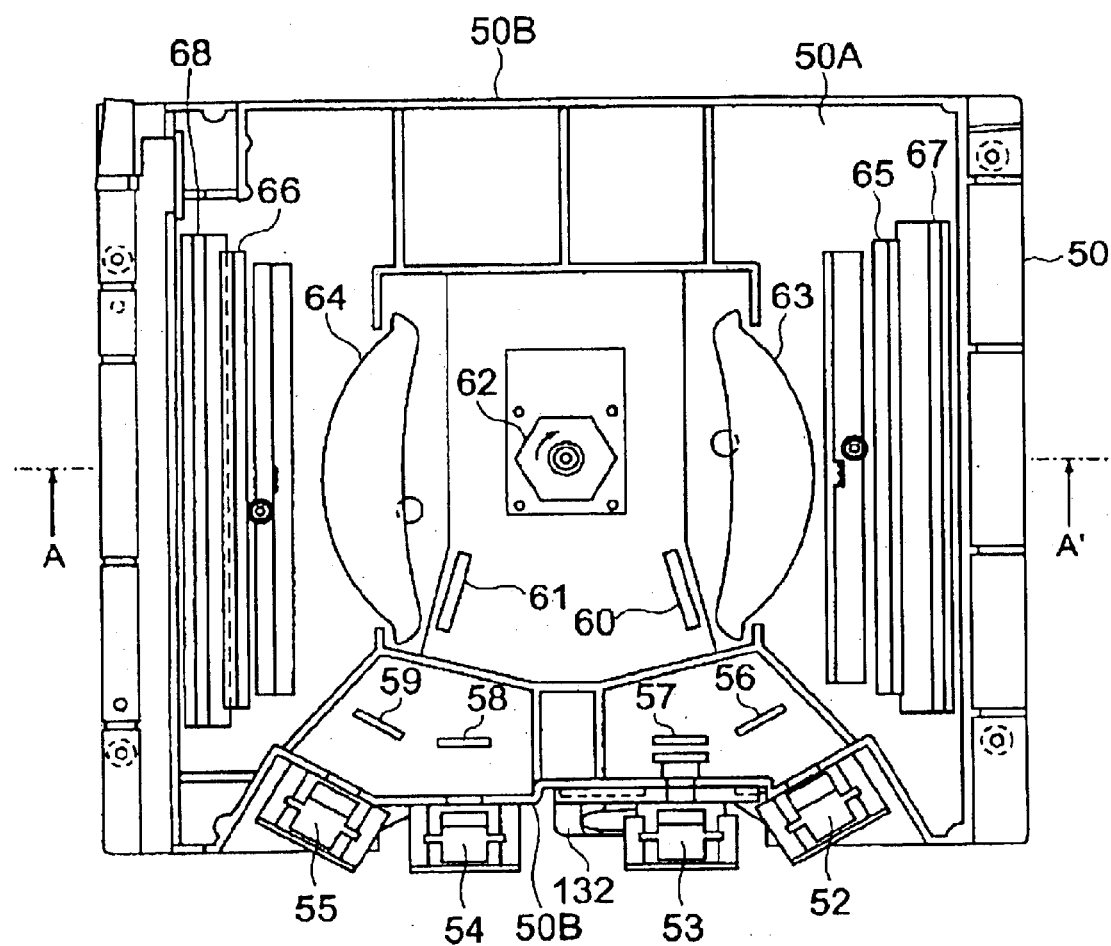
FIG. 5 is a top plan view of an optical scanner according to the present invention.
Figure 6:
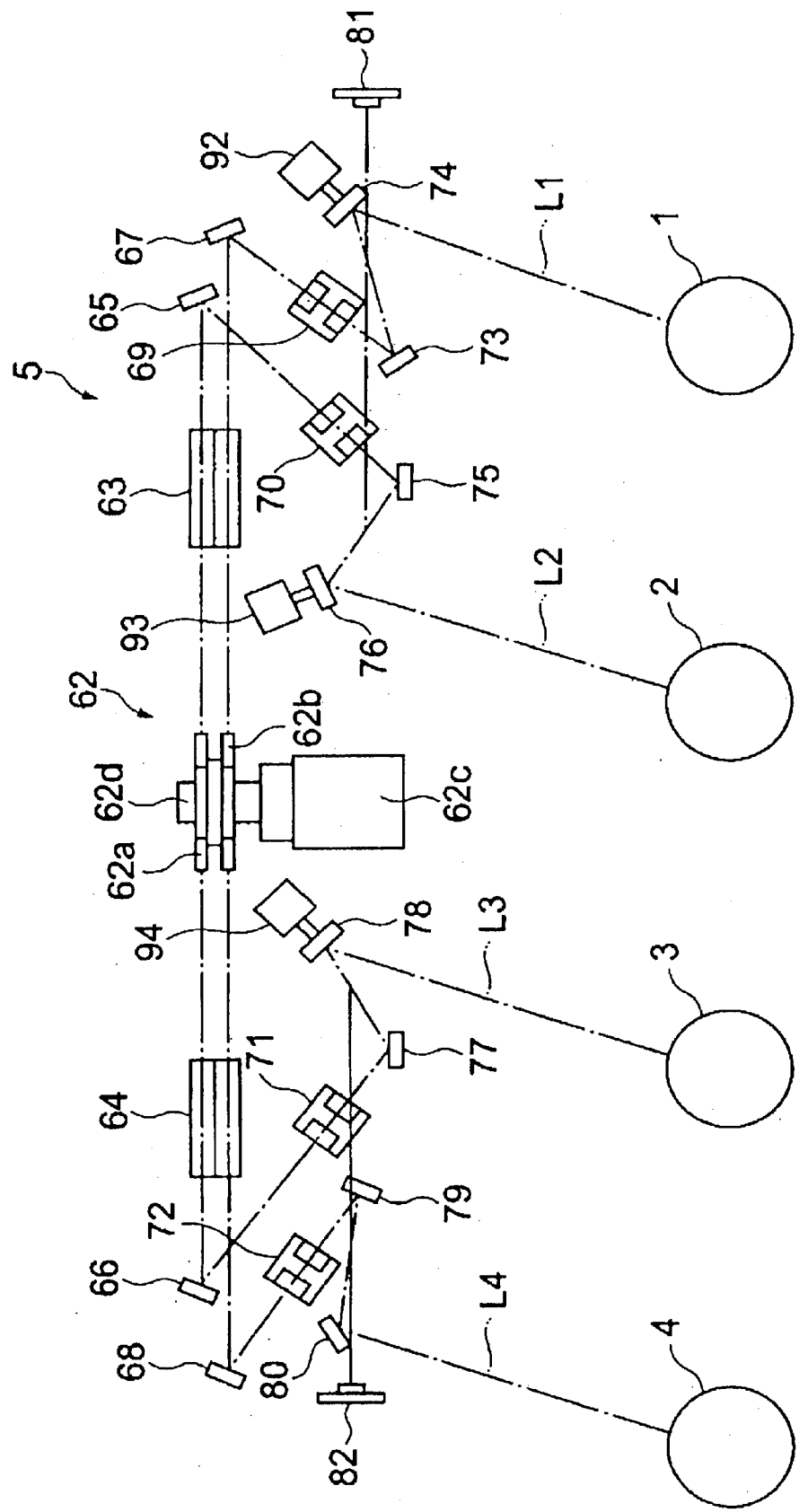
FIG. 6 is a diagram illustrating arrangement of an optical deflector and optical systems in the optical scanner according to the present invention.

FIG. 5 is a top plan view of the optical scanner 5 from the upper portion thereof. FIG. 6 shows an arrangement of an optical deflector and optical systems in the optical scanner 5.

Referring to FIG. 5 and FIG. 6, the optical scanner 5 comprises four illuminant units 52, 53, 54 and 55, an optical deflector 62, beam focusing lenses 63, 64, 69, 70, 71 and 72, optical path folding mirrors 65, 66, 67, 68, 73, 74, 75, 76, 77, 78, 79 and 80. These components are accommodated in the housing 50. The four illuminant units 52, 53, 54 and 55 emit optical beams L1, L2, L3 and L4, respectively. The optical deflector 62 deflects the optical beams L1, L2, L3 and L4 such that two pairs of the four beams L1, L2, L3 and L4 propagate in two directions symmetric to each other. Image forming optical systems, which include the beam focusing lenses 63, 64, 69, 70, 71 and 72, and the optical path folding mirrors 65, 66, 67, 68, 73, 74, 75, 76, 77, 78, 79 and 80, lead the deflected optical beams L1, L2, L3 and L4 on scanned surfaces of the corresponding photosensitive drums 1, 2, 3 and 4, as illustrated in FIG. 6.

Figure 7:
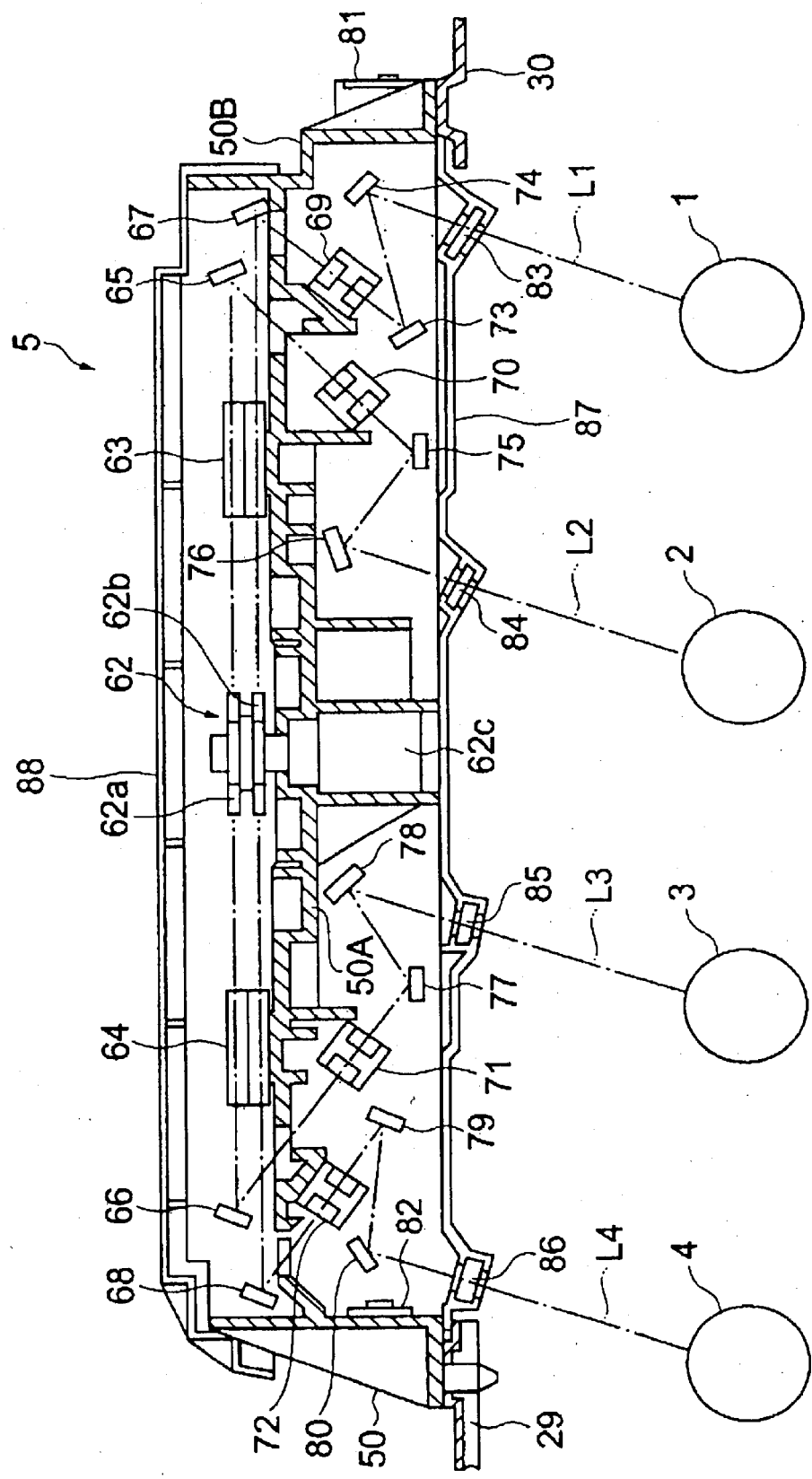
FIG. 7 is a cross-sectional view of the optical scanner according to the present invention as viewed from the plane A—A' in FIG. 5.

FIG. 7 is a cross-sectional view of the optical scanner 5 as viewed from the A–A' plane in FIG. 5.

As shown in FIG. 5 and FIG. 7, the housing 50 includes a substrate 50A to which the optical deflector 62 and the optical systems are mounted, and a sidewall 50B for surrounding the substrate 50A. The substrate 50A is located near the center of the housing 50 with respect to the vertical direction thereof (top to bottom in FIG. 7) and partitions an inner space in the housing 50 into upper and lower portions. The four illuminant units 52, 53, 54 and 55 are mounted to the sidewall 50B (FIG. 5) in almost parallel relation to the arrangement of the photosensitive drums 1, 2, 3 and 4 (FIG. 4). As shown in FIG. 7, the optical deflector 62 is located in the center of the substrate 50A. The above-mentioned optical systems such as the beam focusing lenses 63, 64, 69, 70, 71 and 72 and the optical path folding mirrors 65, 66, 67, 68, 73, 74, 75, 76, 77, 78, 79 and 80 are provided in both portions (the upper portion and the lower portion) of the inner space partitioned by the substrate 50A. Also, covers 87 and 88 are provided in the lower side and the upper side of the housing 50, respectively. The lower cover 87 has apertures for passage of optical beams, and dustproof glasses 83, 84, 85 and 86 are provided to each of the apertures.

Figure 8:
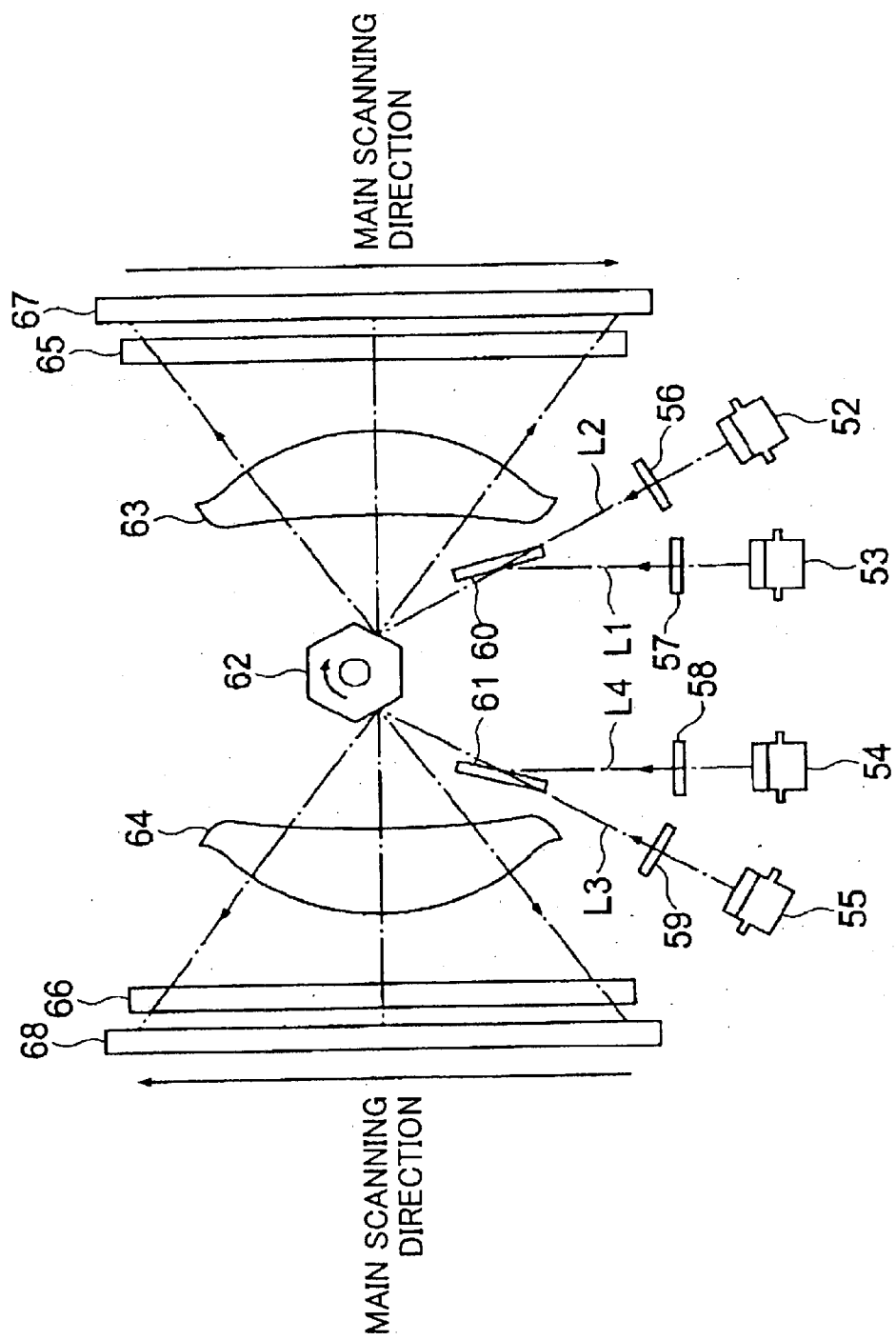
FIG. 8 is a diagram illustrating arrangement of illuminant units, the optical deflector and the optical systems in the optical scanner according to the present invention.

FIG. 8 shows an arrangement of the illuminant units 52, 53, 54 and 55, the optical deflector 62 and the optical systems in the optical scanner 5. As shown in FIG. 8, when image data of individual colors are provided to the optical scanner 5 from a manuscript reading apparatus such as a scanner or an image data output apparatus such as a personal computer, a word processor, or a facsimile receiver, which are not illustrated, the optical scanner 5 converts the individual color image data into signals for driving the illuminant units 52, 53, 54 and 55. The illuminant units 52, 53, 54 and 55 emit optical beams in accordance with the signals. The optical beams propagate through cylindrical lenses 56, 67, 58 and 59 for correcting optical face tangle errors and then arrive at the optical deflector 62 directly or via mirrors 60 and 61. The optical beams are deflected in the two symmetric directions by two-tiered polygon mirrors 62a and 62b rotated by a polygon motor 62c at constant speed as shown in FIGS. 7 and 8. Here, the two-tiered polygon mirrors 62a and 62b deflect a pair of the optical beams L2 and L3 and a pair of the optical beams L1 and L4, respectively. Although the optical deflector 62, as illustrated, uses two polygon mirrors 62a and 62b, the optical deflector 62 may use, for example, one large polygon mirror to deflect the four optical beams L1, L2, L3 and L4.

As shown in FIG. 7, the deflected optical beams are transmitted through image forming lenses 63 and 64. For instance, two-tiered fθ lenses can be used as the image forming lenses 63 and 64. The optical beams L1, L2, L3 and L4 are folded by the first folding mirrors 65, 66, 67 and 68 and then travel through the apertures of the substrate 50A. After passage through the apertures of the substrate 50A, the optical beams L1, L2, L3 and L4 travel through the second image forming lenses 69, 70, 71 and 72, and then arrive on the scanned surfaces of the photosensitive drums 1, 2, 3 and 4 via the second folding mirrors 73, 75, 77 and 79, the third folding mirrors 74, 76, 78 and 80, and the dustproof glasses 83, 84, 85 and 86. When the optical beams L1, L2, L3 and L4 are irradiated on the scanned surfaces of the photosensitive drums 1, 2, 3 and 4, it is possible to write latent images on the scanned surfaces.

In the optical scanner 5, each of the illuminant units 52, 53, 54 and 55 comprises a semiconductor laser (LD) working as an illuminant and a collimate lens for collimating a luminous flux emitted by the semiconductor laser. The semiconductor laser and the collimate lens are integrally accommodated in a retaining member such as a holder. In the illustrated embodiment, the illuminant unit 52 is a BK illuminant unit. Since the BK illuminant unit 52 is more frequently used than any other color illuminant units to form monochrome images, it is preferable that the illuminant unit 52 be constituted as a multi-beam illuminant unit wherein at least two pairs of illuminants and collimate lenses are integrally accommodated in the retaining member thereof. As a result, when the monochrome images are formed, it is possible to optically write the monochrome images at a high speed and, therefore, to improve productivity of the image forming apparatus with respect to monochrome image formation.

Figure 9:
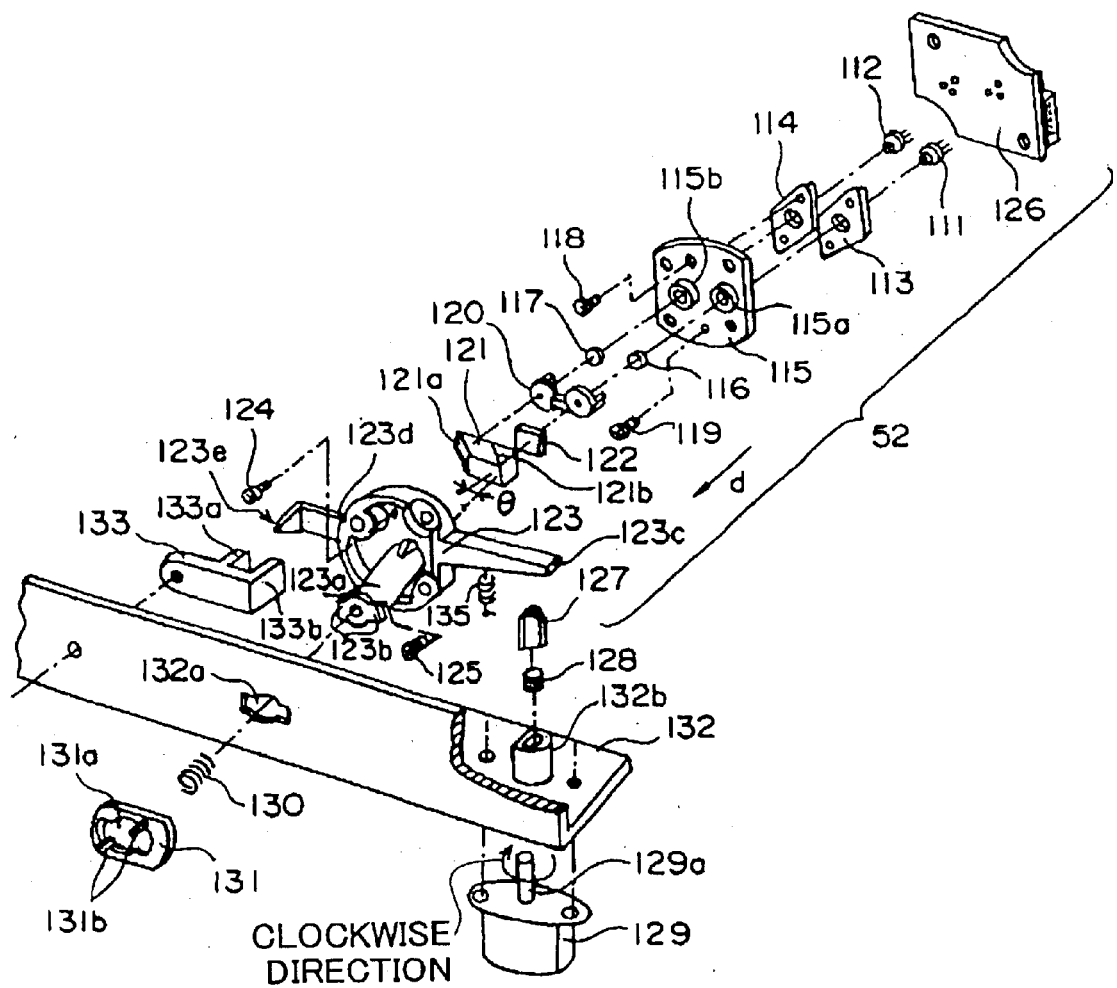
FIG. 9 is an exploded perspective view of a multi-beam illuminant unit of the optical scanner according to the present invention.
Figure 10:
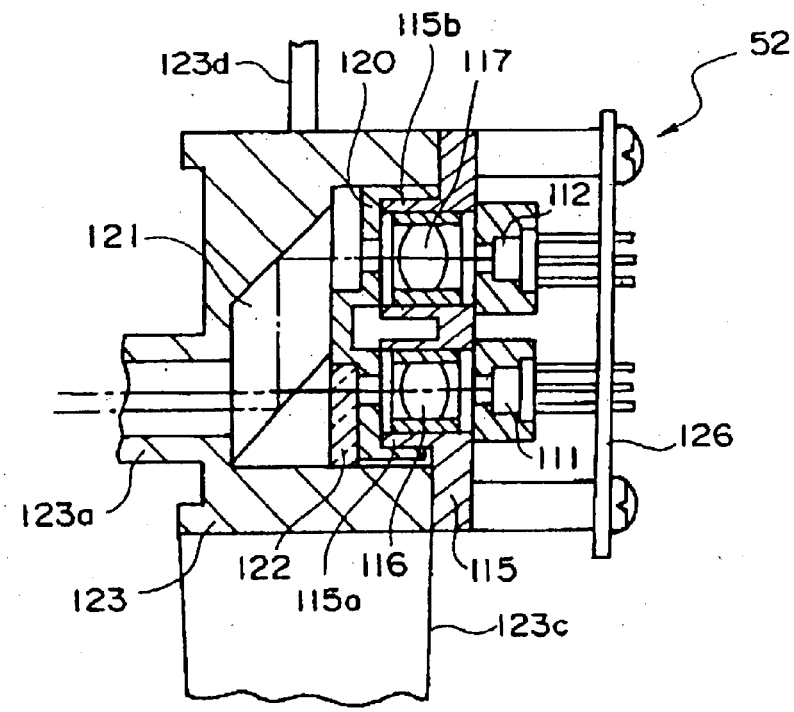
FIG. 10 is a cross-sectional view of the multi-beam illuminant unit of the optical scanner according to the present invention.

A description will now be given, with reference to FIG. 9 and FIG. 10, of a multi-beam illuminant unit serving as a BK illuminant unit. FIG. 9 is an exploded perspective view of the multi-beam illuminant unit. FIG. 10 is a cross-sectional view of the multi-beam illuminant unit.

Referring to FIG. 9 and FIG. 10, semiconductor lasers 111 and 112, which serve as illuminants of the multi-beam illuminant unit 52, are fixed to supporting members 113 and 114, respectively. The semiconductor lasers 111 and 112 are connected to a collimate lens holder 115 with fasteners 118 and 119 via the supporting members 113 and 114 such that optical beams from the semiconductor lasers 111 and 112 coincide with optical axes of collimate lenses 116 and 117, respectively. The collimate lenses 116 and 117 are accommodated in cylindrical mirror holders and are connected to holes 115a and 115b in the collimate lens holder 115 by a suitable adhesive such that the collimate lenses 116 and 117 are positioned, as illustrated, for example, relative to the respective semiconductor lasers 111 and 112. The collimate lenses 116 and 117 convert the optical beams from the semiconductor lasers 111 and 112 into parallel luminous fluxes. An iris plate 120 is provided at the exit end of the collimate lenses 116 and 117 so that each of the outgoing optical beams can have a predetermined beam diameter. A beam synthesizing part 121 such as a prism is provided behind or downstream of the iris plate 120.

The two semiconductor lasers 111 and 112 are arranged in the same plane such that a pn junction surface of the semiconductor laser 111 coincides with that of the semiconductor laser 112. A ½ wavelength plate 122 is provided at the entrance end of the beam synthesizing part 121 so as to rotate by 90° a polarization surface of one of the two optical beams from the semiconductor lasers 111 and 112, for example, the optical beam from the semiconductor laser 111 in the illustrated embodiment. The resulting optical beam whose polarization surface is rotated by 90° travels to a polarization beam splitter surface 121b (FIG. 9) of the beam synthesizing part 121. The optical beam from the semiconductor laser 112, on the other hand, is inner-reflected on a sloped surface 121a of the beam synthesizing part 121 and also is reflected on the polarization beam splitter surface 121b. The resulting optical beam from the semiconductor laser 112 is synthesized with the optical beam from the semiconductor laser 111 in the vicinity of the optical axis of the optical beam from the semiconductor laser 111, which is considered as a reference optical beam. At this time, the optical axes of the semiconductor lasers 111 and 112 are directed in slightly different directions from each other with respect to the main scanning direction. Here, an angle between the optical axes is set as θ in the exit side of the beam synthesizing part 121 as shown in FIG. 9.

The beam synthesizing part 121 and the iris plate 120 are mounted at predetermined positions on an entrance or upstream surface of a flange member 123, and the flange member 123 is fixed to the collimate lens holder 115 with fasteners 124 and 125. The flange member 123 and/or the collimate lens holder 115 is fixed on (not illustrated) a substrate 126 on which a drive circuit for driving the semiconductor lasers 111 and 112 is provided. In this configuration, the members along the optical paths between the semiconductor lasers 111 and 112 and the flange member 123 are fixed on the substrate 126, and these members constitute the illuminant unit 52.

As shown in FIG. 9, a cylinder part 123a is mounted to the exit or downstream end of the flange member 123. The cylinder part 123a is inserted into a hole 132a of a frame 132 provided on the sidewall 50B of the housing 50 (FIG. 7). The cylinder part 123a is inserted through the interior of a helical spring 130 and further through a hole 131a of a spring pressure plate 131. In this configuration, if the BK illuminant unit 52, which has the members between the semiconductor lasers 111 and 112 and the flange 123 on the substrate 126, is pulled in the direction of the arrow α in FIG. 9 and then the spring pressure plate 131 is rotated 90° it is possible to hook a projection 131b of the spring pressure plate 131 on a projection 123b of the cylinder part 123a. As a result, the BK illuminant unit 52 is mounted to the frame 132 in a state where the BK illuminant unit 52 can be freely rotated with respect to the center (optical axis) of the cylinder part 123a of the flange member 123.

Since the illuminant unit 52 can be rotated with respect to the optical axis, it is possible to adjust a pitch between optical spots on the photosensitive drum. A pitch changing part, which is described hereinafter, is used to adjust the optical spot pitch.

In FIG. 9, a male screw whose nominal diameter is M3 is shaped on a feed screw 128, and a female screw is shaped in the interior of a moving member 127. The moving member 127 has a somewhat D-shaped outer body. The male screw of the feed screw 128 is inserted into the female screw of the moving member 127. The moving member 127 is inserted into a D-shaped hole of a cylinder 132b that is provided in the frame 132 in the housing 50, as illustrated. The moving member 127 is slidably movable in the cylinder 132b. Here, a rotation shaft 129a of a pitch change stepping motor 129 is inserted through the hole of the cylinder 132b of the frame 132. The lower end of the feed screw 128 is fixed to the top end of the rotation shaft 129a, for example, by means of a pressure fit. The pitch change stepping motor 129 is connected to the frame 132 so that the feed screw 128, which is pressed to the rotation shaft 129a, can be rotated through rotation of the pitch change stepping motor 129. Since the cylinder 132b has the corresponding D-shaped hole, the moving member 127 is able to make up-and-down motions (FIG. 9).

The flange member 123 has an arm 123c. The arm 123c extends toward the moving member 127, and the end of the arm 123c is in contact with the top end of the moving member 127. A tension spring 135 is provided between the arm 123c and the frame 132. The tension spring 135 pulls down the arm 123c so that the end of the arm 123c can be depressed on the moving member 127. As a result, when the moving member 127 moves in the vertical direction through rotational motions by the pitch change stepping motor 129, the arm 123c moves up-and-down in the vertical direction. According to such an arrangement, the illuminant unit 52 may be rotated wherein the center of the cylinder 123a of the flange member 123 is the rotational axis.

An optical home position sensor 133 for controlling a rotation angle of the illuminant unit 52 is fixed with fasteners that are not illustrated. The optical home position sensor 133 has an illuminant part 133a and a receiver part 133b in the side of the frame 132. A filler 123d is provided in the side opposite to the arm 123c of the flange member 123. The filler 123d has an edge part for screening between the illuminant part 133a and the receiver part 133b of the home position sensor 133. A home position (HP) of the optical home position sensor is determined as the position at the time when the edge part 123e screens between the illuminant part 133a and the receiver part 133b. The home position is used as a reference position for adjusting rotation of the illuminant unit 52.

Figure 11:
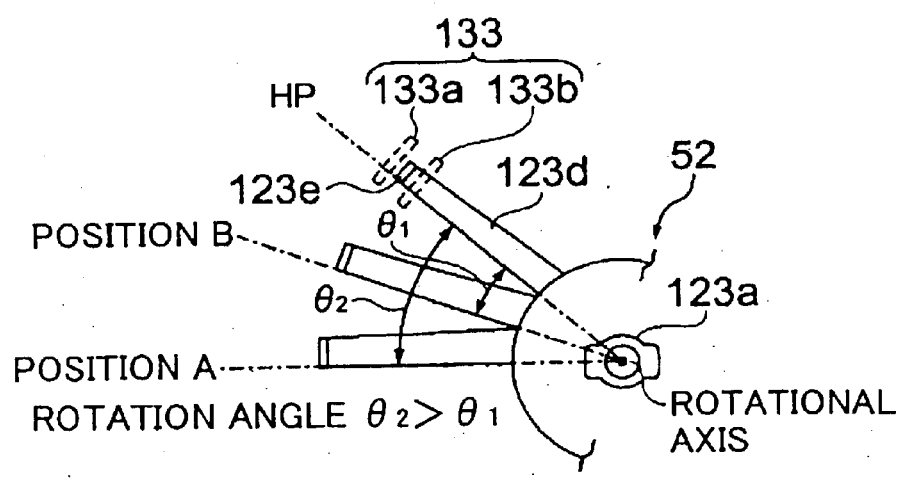
FIG. 11 is a diagram for explaining rotation adjustment of the multi-beam illuminant unit of the optical scanner according to the present invention.

FIG. 11 is a diagram for explaining the rotation adjustment of the illuminant unit 52 for the purpose of changing a pitch of optical spots with respect to the sub-scanning direction. In FIG. 11, dotted lines indicate positions of the illuminant part 133a and the receiver part 133b. As mentioned above, the home position is set as the position of the home position sensor 133 at the screening time of the edge part 123e. The position B in FIG. 11 is a position of the home position sensor 133 where the illuminant unit 52 is rotated by a rotation angle of θ1 from the home position with respect to a rotational axis as the optical axis thereof. In order to rotate the illuminant unit 52 by the rotation angle of θ1, it is necessary to shift the moving member 127 at a predetermined distance in the upper direction by rotating the pitch change stepping motor 129 by a predetermined number of pulses. Similarly, the position A in FIG. 11 indicates a position of the home position sensor 133 where the illuminant unit 52 is rotated by a rotation angle of θ2 from the home position with respect to the rotational axis.

Figure 12A:
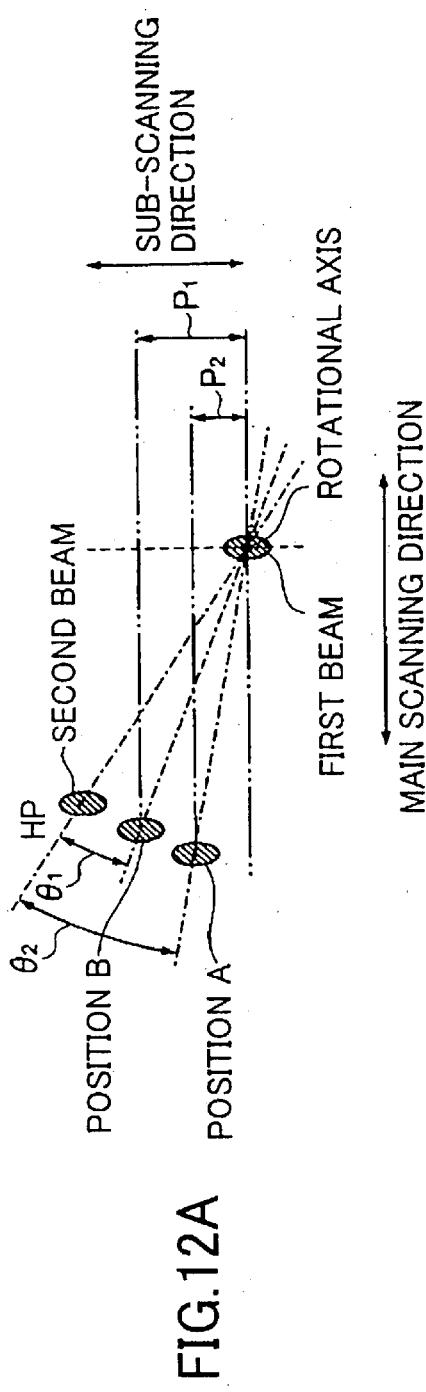
FIGS. 12A and 12B are diagrams illustrating shift positions of optical spots on a photosensitive drum corresponding to rotation angles of the multi-beam illuminant unit of the optical scanner according to the present invention.
Figure 12B:
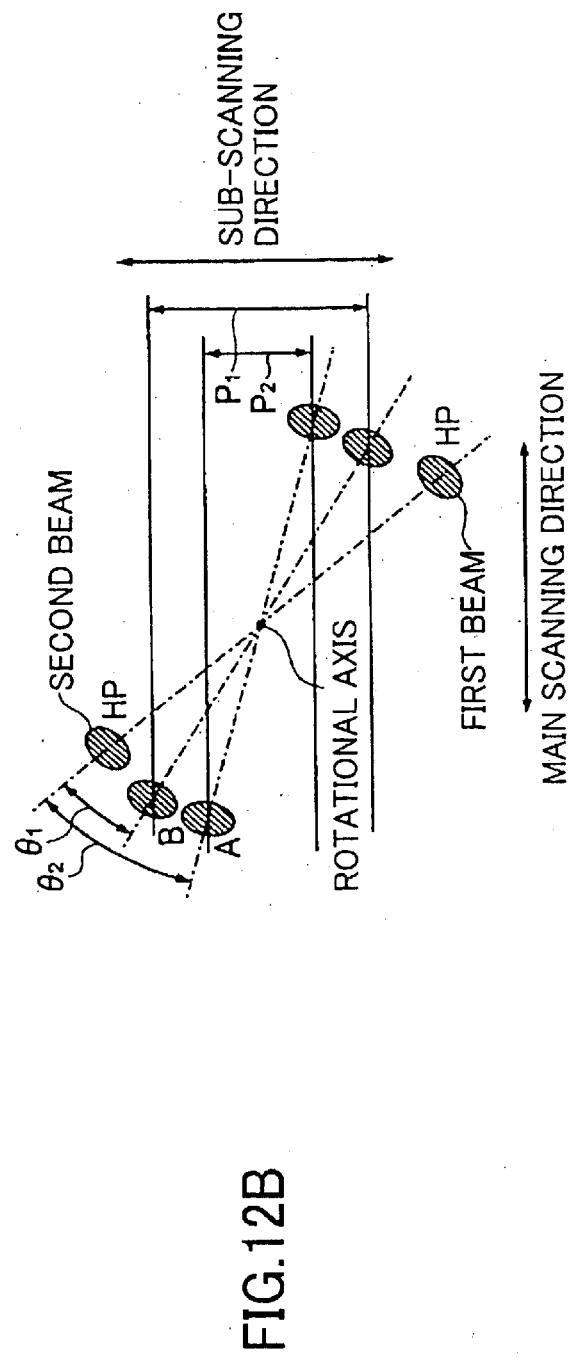

FIGS. 12A and 12B show positions of optical spots on a photosensitive drum when the illuminant unit 52 is rotated such that the home position sensor 133 is located at the home position and the position A and B. FIG. 12A is a diagram illustrating a case where a position of one of optical beams from the two semiconductor lasers 111 and 112 is set as the rotational axis, and FIG. 12B is a diagram illustrating a case where a middle position between the two optical beams is set as the rotational axis. In FIGS. 12A and 12B, the lengths P1 and P2 represent pitches of the optical spots on the photosensitive drum with respect to the sub-scanning direction corresponding to the rotation angles of θ1 and θ2. As seen in FIGS. 12A and 12B, if the illuminant unit 52 is rotated from the home position, it is possible to change the pitches of the optical spots on the photosensitive drum and easily control the rotation by adjusting the driving number of pulses of the pitch change stepping motor 129.

Normally, the pitches of optical spots on the photosensitive drum with respect to the sub-scanning direction are changed in accordance with a record density. For instance, it may be assumed that the driving pulse number Pa corresponding to the record density of 600 dpi is set as 42 μm and the driving pulse number Pb corresponding to the record density of 1200 dpi is set as 21 μm. If the pulse numbers Pa and Pb are stored in a memory in a control part of an image forming apparatus, it is possible to easily switch the pitches of optical spots on the photosensitive drum with respect to the sub-scanning direction by rotating the pitch change stepping motor 129 based on the stored data regarding the driving pulse numbers Pa and Pb in accordance with a requested record density.

Once the image forming apparatus is switched ON, the image forming apparatus locates the illuminant unit 52 at a predetermined position, for instance, by rotating the illuminant unit 52 by the rotation angle (to position B) corresponding to the record density of 600 dpi. In order to locate the illuminant apparatus 52 at that position, when the image forming apparatus is switched ON, the image forming apparatus returns the illuminant unit 52 to the home position. Thereafter, the pitch change stepping motor 129 is driven by the pulse number Pa in a predetermined direction so as to locate the pitch change stepping motor 129 at the position B. As a result, it is possible to rotate the illuminant unit 52 by the rotation angle of θ1 so that optical spots on the photosensitive drum can have the pitch P1 corresponding to the position B with respect to the sub-scanning direction. Here, the image forming apparatus has information regarding the predetermined rotation angles in the memory of the control part such as a CPU (Central Processing Unit). Accordingly, when the record density of 1200 dpi is requested, the image forming apparatus drives the pitch change stepping motor 129 by the pulse number of (Pb-Pa) so that the illuminant unit 52 can be rotated from the position B, which is the position corresponding to the record density of 600 dpi. As a result, it is possible to properly change the pitch of the optical spots by rotating the illuminant unit 52 to the position A, which is the position corresponding to the record density of 1200 dpi.

Figure 13:
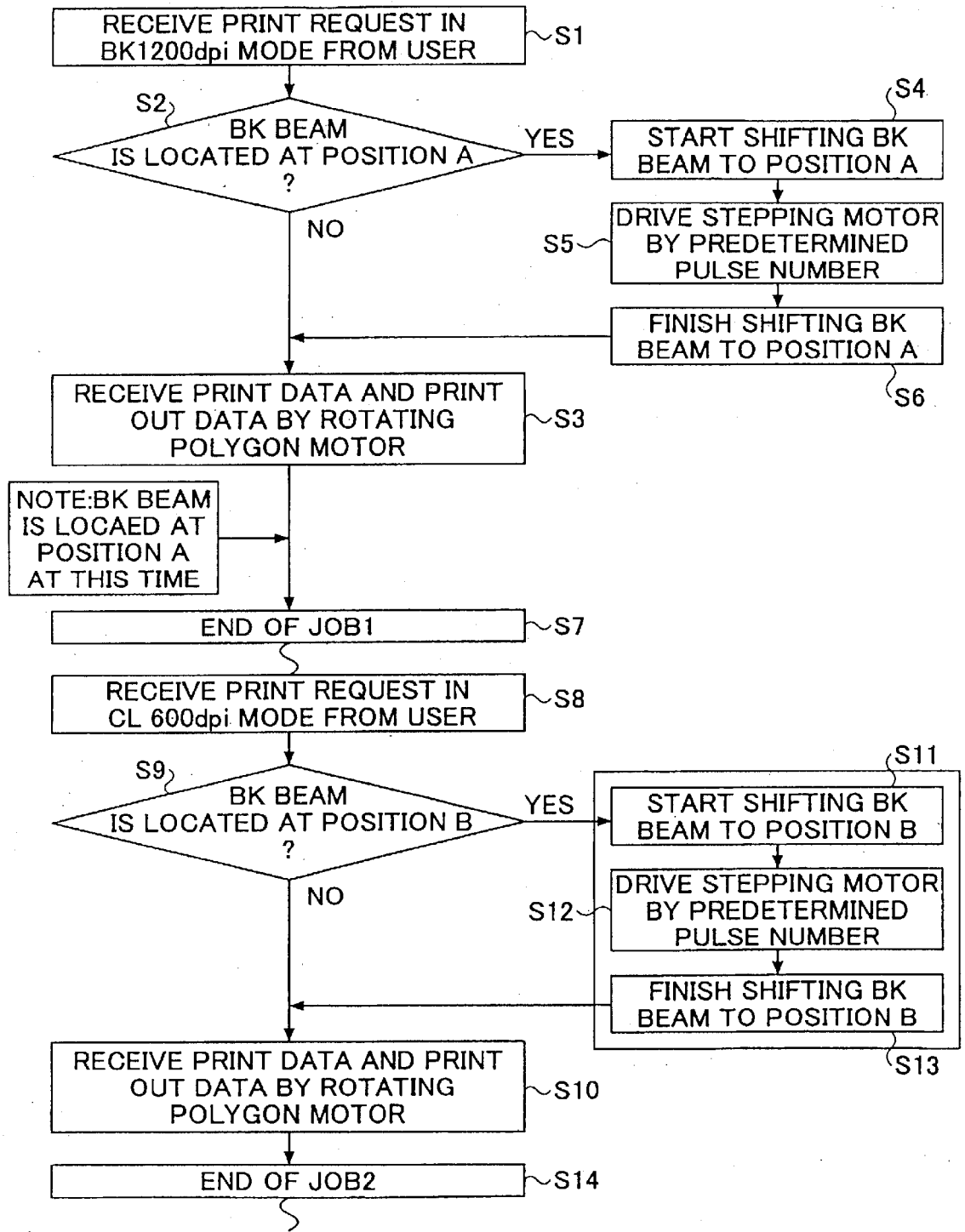
FIG. 13 is a flowchart of a procedure for adjusting a pitch between optical spots from the multi-beam illuminant unit of the optical scanner according to the present invention.

FIG. 13 is a flowchart of the above-mentioned procedure. As shown in FIG. 13, a user selects the record density of 1200 dpi in a black mode (BK 1200 dpi mode) at step S1. At step S2, it is determined whether or not a pitch position of a BK beam is located at the position A. At step S3, if the pitch position is currently located at the position A, the image forming apparatus receives print data and then performs a normal printing process by rotating the polygon motor 62c. On the other hand, if the pitch position is not located at the position A, the pitch position is shifted to the position A at step S4. After the pitch position has been shifted to the position A by rotating the pitch change stepping motor 129 by the pulse number of (Pb-Pa) at step S6, the image forming apparatus is ready to write the sent print data at the position A corresponding to the record density of 1200 dpi. Then, the image forming apparatus proceeds to the step S3 to perform the writing procedure. Here, it is noted that the pitch position is located at the position A just after step S3.

Subsequently, if the user selects a color mode print under the record density of 600 dpi, the image forming apparatus proceeds to step S8. At step S9, it is determined whether or not the pitch position is located at the position B. However, since the pitch position is located at the position A after step S3, the branch condition at step S9 is normally determined as NO. Then, the pitch change stepping motor 129 is driven by the pulse number of (Pb-Pa) in the direction opposite to the rotational direction at step S5 so as to move the pitch position to the position B at step S11 and step S12. After shifting the pitch position to the position B at step S13, the image forming apparatus receives write data and then performs the normal printing process by rotating the polygon motor 62c at step S10. In this fashion, the whole procedure is completed at step S14.

Here, the above-mentioned procedure is automatically performed by a printer driver of the image forming apparatus in accordance with user's requests, received data or received instructions. Then, an image is printed out at a requested record density.

The optical scanner 5 shown in FIG. 5 and FIG. 6 has synchronization detecting mirrors, which are not illustrated, for retrieving luminous fluxes of start scanning positions in the main scanning direction on optical paths of the optical beams L1, L2, L3 and L4. Synchronization detectors 81 and 82 receive the luminous fluxes reflected on the synchronization detecting mirrors and supply synchronization signals for start timings of scanning. Furthermore, stepping motors 92, 93 and 94 for adjusting skew are provided in the third-folding mirrors 74, 75 and 76 on the optical paths of the optical beams L1, L2 and L3, respectively, as shown in FIG. 6. The stepping motors 92, 93 and 94 are used to correct misalignment of scanning lines of the optical beams L1, L2 and L3 with reference to the scanning line of the optical beam L1. Here, the main scanning direction is defined as a direction where the optical beams deflected by the optical deflector 62 scan the photosensitive drums, that is, the axis directions of the photosensitive drums. Also, the sub-scanning direction is a direction perpendicular to the main scanning direction, that is, the rotation direction of the photosensitive drums (moving directions of the surfaces of the photosensitive drums). Also, the sub-scanning direction is a carrying direction of a transferring-carrying belt 22a to be mentioned later. For this reason, it is concluded that the width direction of the transferring-carrying belt 22a is the main scanning direction, and the carrying direction thereof is the sub-scanning direction.

As shown in FIG. 4, the transferring-carrying belt 22a is disposed under the four photosensitive drums 1, 2, 3 and 4. The transferring-carrying belt 22a is supported by drive rollers and dependent rollers and is carried in the arrow direction in FIG. 4 by the drive rollers. Furthermore, paper feeding parts 23 and 24 for accommodating transferred members such as record papers are provided in the lower part of the image forming apparatus. The transferred members in the paper feeding parts 23 and 24 are fed to the transferring-carrying belt 22a via paper feeding rollers, carrying rollers and a resist roller 25 and then are carried by the transferring-carrying belt 22a.

After the optical scanner 5 forms latent images for the individual photosensitive drums 1, 2, 3 and 4, the latent images are developed with individual color toners of BK, C, M and Y by the developing parts 10, 11, 12 and 13. The developed toner images of individual colors are sequentially superposed on a transferred member on the transferring-carrying belt 22a by the transferring parts 14, 15, 16 and 17 of the transferring-carrying apparatus 22. Then, the transferred member on which the four color images are transferred is delivered to the fixing apparatus 26 and then is fixed therein. Thereafter, the resulting transferred member is delivered to the output tray 28 by the paper output roller 27. Here, if the image forming apparatus is in the monochrome image forming mode, the above-mentioned process is performed for only the BK photosensitive drum 1.

According to the above-mentioned image forming apparatus, when resist adjustment is performed for a full-color image with respect to the main scanning direction and the sub-scanning direction regardless of the resolutions of 600 dpi and 1200 dpi, the image forming apparatus can adjust the BK pixel density position at a predetermined position and write the full-color image at the adjusted pixel density position. As a result, it is possible to provide the tandem type color image forming apparatus that can overcome misalignment of writing positions of the color image.

Here, the above-mentioned embodiments concentrate on the optical scanner and the image forming apparatus that can switch the write density into the two resolutions of 600 dpi and 1200 dpi. However, the optical scanner and the image forming apparatus according to the present invention can also deal with a resolution of 2400 dpi in addition to the resolutions of 600 dpi and 1200 dpi in a similar configuration.

The present invention is not limited to the specifically disclosed embodiments, and variations and modifications may be made without departing from the scope of the present invention.

The present application is based on Japanese priority application No. 2002-169989 filed Jun. 11, 2002, the entire contents of which are hereby incorporated by reference.

What is claimed is:

1. An optical scanner for writing an image in an image formed medium, comprising:
   a black writing illuminant optically writing said image at a plurality of record densities;
   a color writing illuminant optically writing said image at a predetermined record density;
   a storage part storing writing position data of said black writing illuminant corresponding to said record densities; and
   a writing position switching part switching a writing position of the black writing illuminant based on said writing position data in the storage part so as to properly form a full-color image,
   wherein said writing position data are used to adjust a resist position for said full-color image with respect to a main scanning position and a sub-scanning position.

2. The optical scanner as claimed in claim 1, wherein said black writing illuminant comprises at least two semiconductor lasers, a retaining part retaining said semiconductor lasers in a state where said semiconductor lasers are fixed relative to each other, a supporting part supporting said retaining part such that said retaining part can be rotated with respect to a predetermined rotational axis, and a driving part rotating said retaining part with respect to said rotational axis.

3. The optical scanner as claimed in claim 2, wherein said driving part comprises a stepping motor.

4. The optical scanner as claimed in claim 3, wherein said writing position switching part drives said stepping motor so as to switch the writing position of the black writing illuminant based on the writing position data in the storage part.

5. The optical scanner as claimed in claim 2, wherein said black writing illuminant has two semiconductor lasers, and said rotational axis is located at one of a middle point between writing positions of said two semiconductor lasers and a writing position of one of the two semiconductor lasers.

6. An image forming apparatus, comprising:
   an optical scanner writing an image in an image formed medium, said optical scanner comprising: a black writing illuminant optically writing said image at a plurality of record densities; a color writing illuminant optically writing said image at a predetermined record density; a storage part storing writing position data of said black writing illuininant corresponding to said record densities; and a writing position switching part switching a writing position of the black writing illuminant based on said writing position data in the storage part so as to properly form a full-color image, wherein said writing position data are used to adjust a resist position for said full-color image with respect to a main scanning position and a sub-scanning position; and
   an image forming part developing individual color images written by said optical scanner and forming said full-color image on a record medium.

7. The image forming apparatus as claimed in claim 6, wherein said optical scanner optically writes the individual color images on image carrying members, which are linearly arranged, corresponding to the color images.

8. An optical scanner for writing an image in an image formed medium, comprising:
   means for optically writing a monochrome image at a plurality of record densities;
   means for optically writing a color image at a predetermined record density;
   means for storing writing position data of said means for writing the monochrome image corresponding to said record densities; and
   means for switching a writing position of the means for writing the monochrome image based on said writing position data in the means for storing the writing position data so as to properly form a full-color image, wherein said writing position data are used to adjust a resist position for said full-color image with respect to a main scanning position and a sub-scanning position.

9. The optical scanner as claimed in claim 8, wherein said means for writting the monochrome image comprises at least two semiconductor lasers, means for retaining said semiconductor lasers in a state where said semiconductor lasers are fixed relative to each other, means for supporting said means for retaining the semiconductor lasers such that said means for retaining the semiconductor lasers can be rotated with respect to a predetermined rotational axis, and means for rotating said means for retaining the semiconductor lasers with respect to said rotational axis.

10. The optical scanner as claimed in claim 9, wherein said means for rotating the means for retaining the semiconductor lasers comprises a stepping motor.

11. The optical scanner as claimed in claim 10, wherein said means for switching the writing position of the means for writing the monochrome image drives said stepping motor so as to switch the writing position of the means for writing the monochrome image based on the writing position data in the means for storing the writing position data.

12. The optical scanner as claimed in claim 9, wherein said means for writing the monochrome image has two semiconductor lasers, and said rotational axis is located at one of a middle point between writing positions of said two semiconductor lasers and a writing position of one of the two semiconductor lasers.

13. An image forming apparatus, comprising:

an optical scanner writing an image in an image formed medium, said optical scanner comprising: means for optically writing a monochrome image at a plurality of record densities; means for optically writing a color image at a predetermined record density; means for storing writing position data of said means for writing the monochrome image corresponding to said record densities; and means for switching a writing position of the means for writing the monochrome image based on said writing position data in the means for storing the writing position data so as to properly form a full-color image, wherein said writing position data are used to adjust a resist position for said full-color image with respect to a main scanning position and a sub-scanning position; and means for developing individual color images written by said optical scanner and forming said full-color image on a record medium.

14. The image forming apparatus as claimed in claim 13, wherein said optical scanner optically writes the individual color images on image carrying members, which are linearly arranged, corresponding to the color images.

* * * * *